Patented Oct. 19, 1948

2,451,736

UNITED STATES PATENT OFFICE 2,451,736

POLYENES AND PROCESS FOR THE MANUFACTURE THEREOF

Otto Isler, Basel, Switzerland, assignor to Hoffmann-La Roche Inc., Nutley, N. J., a corporation of New Jersey No Drawing. Application October 16, 1946, Serial No. 703,484. In Switzerland October 18, 1945

10 Claims. (Cl. 260—611)

This invention relates to the manufacture of pentaenes.

The constitution of vitamin A has been known since 1933 (Karrer, "Helvetica Chimica Acta," vol. 16, year 1933, page 557). Many experiments have since been undertaken with a view to obtaining substances possessing vitamin A activity. In 1942 it was, for instance, suggested to prepare compounds possessing the constitution of vitamin A from the aldehyde $C_{14}H_{22}O$ [4-(2',6',6'-trimethyl-cyclohexene-(1')-yl)-2- methyl - butene-(2)-al-(1)] in the following manner (Heilbron, "Journal of the Chemical Society London," year 1942, page 727): Addition of acetylene and methyl-omega-alkoxy-ethyl-ketone or the condensation product thereof, respectively, anionotropic rearrangement, partial hydrogenation of the triple bond and splitting off the water at any stage of the synthesis. However, so far no substantial success in this respect has been reported. Similar processes for the manufacture of vitamin A ethers are claimed by N. Milas in U. S. patent specifications 2,369,157 and 2,382,086. However, a wrong structural formula is ascribed to the aldehyde $C_{14}H_{22}O$, and, consequently, it is not recognised that prior to splitting off water or acid, respectively, the condensation products must be subjected to an allyl rearrangement. The splitting off of water is striven for either by warming with p-toluene-sulphonic acid in toluene or by halogenating by means of phosphorus halogenide and splitting off of acid with alcoholic alkali. According to both these methods the allyl-rearrangement step—not recognised by the author—however, takes place only to a low degree and, consequently, only modest quantities of active vitamin A are obtained.

It has now been found, according to the present invention, that vitamin A-active compounds can be obtained by condensation of 4-(2',6',6'-trimethyl-cyclohexene-(1')-yl) 2-methyl-butene-(2)-al-(1) by a Grignard reaction with an ether of 1-hydroxy-3-methyl-pentene-(2)-yne-(4), in any desired sequence (a) partial hydrogenation of the resulting ether of 1-hydroxy-3,7-dimethyl-6 - hydroxy-9-trimethyl-cyclohexenyl-nonadiene-(2,7)-yne-(4) by the action of 1 mol of hydrogen at the triple bond and (b) esterification by treatment with an acylation agent, and thereupon, splitting off of acid by heating preferably in presence of a basic agent.

The synthesis may be illustrated by the following formulae:

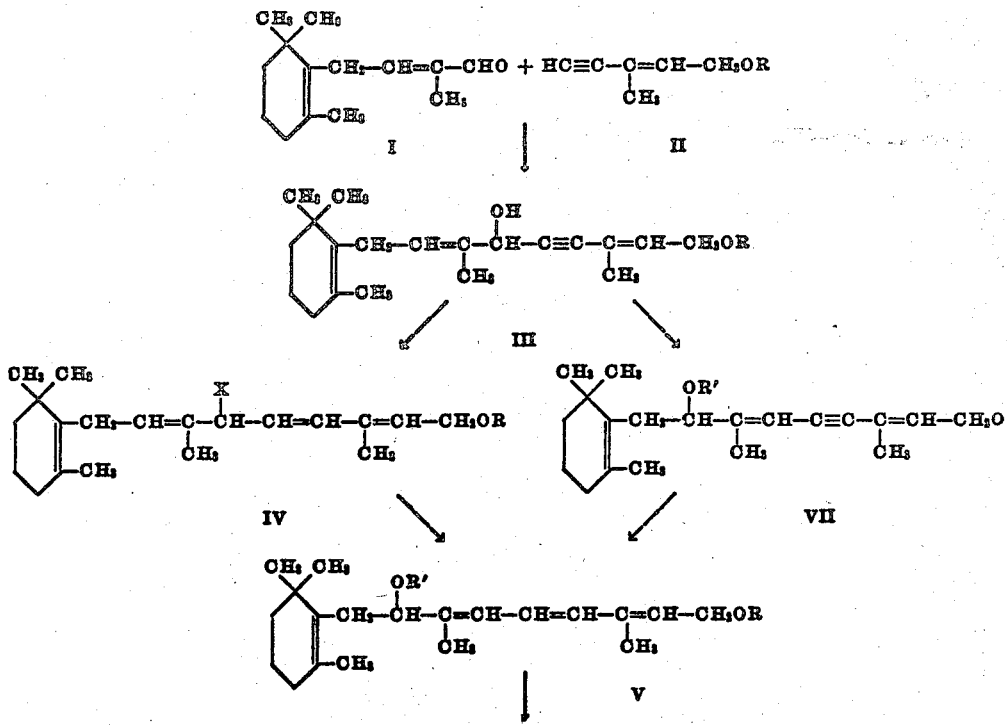

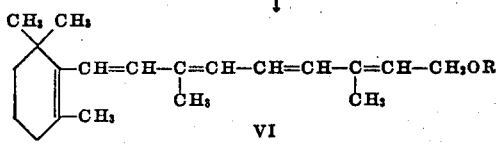

VI

R=alkyl, aryl, aralkyl,
R'=acyl,
X=hydroxyl or acyloxy.

The synthesis of the vitamin A ethers, which all contain the system of five double bonds conjugated to one another, may thus be effected by uniting the two parts I and II to a condensation product III, carrying three double bonds and one triple bond, only two of which are conjugated to one another. Only in the course of the last reaction step, after previous partial hydrogenation of the triple bond, esterification and rearrangement of a double bond, the pentaene chain is formed from the said condensation product by splitting off acid.

The starting materials required, viz.: 4-trimethyl-cyclohexenyl-2-methyl-butenal and the ethers of 1-hydroxy-3-methyl-pentene-(2)-yne-(4) may be prepared as follows:

4-trimethyl-cyclohexenyl-2 - methyl - butene - (2)-al-(1) is obtained from β-ionone by glycide ester synthesis, saponification of the glycide ester formed, and decarboxylation of the glycide acid in vacuo in the presence of copper powder. The said aldehyde $C_{14}H_{22}O$ may be purified by way of the phenylsemicarbazone thereof having its melting point at 182° C. and may be regenerated therefrom just before use by heating with phthalic acid anhydride.

1-alkoxy-3-methyl-pentene-(2)-yne-(4) is obtained by reacting 3-hydroxy-3-methyl-pentene-(1)-yne-(4) (the condensation product of methylvinylketone and acetylene) with acid and alcohol; the hydroxyl group is simultaneously etherified and shifted thereby. 1-methoxy-3-methyl-pentene-(2)-yne-(4) is, for instance, formed in good yield by stirring 3-hydroxy-3-methyl-pentene-(1)-yne-(4) with 30 per cent. methyl-alcoholic sulphuric acid during 4 hours. The substance boils at 73-75° C. under a pressure of 100 mm. Hg; $n_D^{23°}=1.455$.

1-alkoxy-3-methyl-pentene-(2)-yne-(4) may also be prepared by halogenating 3-hydroxy-3-methyl-pentene-(1)-yne-(4) with phosphorus halides, and reacting the primary halide thus formed with sodium alcoholate. The phenyl and the benzyl ether may be prepared correspondingly. Furthermore, the phenyl ether may be obtained in good yield from the primary bromide by boiling with phenol in acetone in the presence of potassium carbonate.

The first step of the present process is a Grignard reaction by which ethers of 1-hydroxy-3-methyl-pentene-(2)-yne-(4) are first reacted with 1 mol of alkyl magnesium halide (for instance, ethyl magnesium bromide). The magnesium compound formed is condensed with 4 - trimethyl - cyclohexenyl - 2 - methyl - butene - (2)-al-(1) in the manner known per se. The reaction takes place in one of the usual solvents, such as ethyl ether. The reaction product is hydrolised in the customary manner, for instance with an ammonium salt solution. Any parts of the aldehyde not having entered into reaction may be separated off in form of a crystallising derivative, for instance, as phenylsemicarbazone.

However, the condensation products of formula III may more suitably be purified by distillation. They are viscous, yellowish oils, not absorbing ultraviolet rays of higher wave length than 260 μ; the solution in arsenic trichloride is of violet colour. By Zerewitinoff analysis the compounds prove to possess one active hydrogen atom.

The condensation product III [ether of 1-hydroxy - 3,7 - dimethyl - 6 - hydroxy - 9 - trimethyl-cyclohexenyl-nonadiene-(2,7)-yne-(4)], suitably after purification, is then partially hydrogenated at the triple bond. (The method with varying reaction course is described below.) Palladium calcium carbonate and palladium barium sulphate may, for instance, be used as catalysts; for the selective hydrogenation of the triple bond, palladium charcoal, onto which quinoline has been adsorbed, is preferred. The introduction of hydrogen is stopped as soon as the calculated quantity of hydrogen has been taken up. It is not necessary to isolate and to purify the hydrogenation products. They are viscous, yellowish oils, not absorbing any ultraviolet rays of higher wave length than 250 μ; their solution in arsenic trichloride or trichloro-acetic-acid-chloroform is of blue colour.

The condensation products IV [ethers of 1-hydroxy - 3,7 - dimethyl-6-hydroxy-9-trimethyl-cyclohexenyl-nonatriene-(2,4,7)] formed by partial hydrogenation are treated with a means effecting a so-called allyl rearrangement, whereby a migration of the hydroxyl group in position 6 into position 8, in given cases with simultaneous substitution, and of the adjacent double bond into position 6 takes place. For this purpose, the ethers of 1-hydroxy-3,7-dimethyl-6-hydroxy-9-trimethyl-cyclohexenyl-nonatriene-(2,4,7) are rearranged in a method known per se by treatment with an organic acylating agent and heating. A method must be chosen which does not entail undesired side-reactions, such as polymerisation and the like. The esterification with organic acylating agents succeeds by the action of acid anhydrides as well as by that of acid chlorides, whereby the migration of the double bond may occur simultaneously with the esterification or by subsequent heating. Thereby (such as, for instance, by boiling with acetic anhydride and alkali acetate or with phthalic acid anhydride in benzene), the separation of acid to be effected in the next reaction step may already take place under the rearrangement and esterification conditions.

For the introduction of a new double bond into compounds V, acid is split off, for which the usual methods may be employed, provided that the desired pentaene (vitamin A ether) remains stable under the reaction conditions. The splitting off of carboxylic acid may be effected by heating and by the action of basic agents, if need be in presence of a diluent. It is of advantage to choose reaction conditions under which the acid split off is continuously eliminated from the reaction mixture.

The same products can also be obtained by the following method with reversed reaction sequence. An acylation agent is allowed to act on condensation product III [ether of 1-hydroxy-3,7 - dimethyl - 6-hydroxy-9-trimethyl-cyclohexenyl-nonadiene-(2,7)-yne-(4)], whereby the allyl rearrangement may take place simultaneously with the esterification or upon subsequent heating. To the triple bond of the resulting ester is added, by catalytical partial hydrogenation, 1 mol of hydrogen. For the purpose of splitting off 1 mol of acid, the product of the partial hydrogenation is heated, preferably in an inert solvent in presence of a basic agent. This method of working, which provides that the acylation and the allyl rearrangement take place prior to the partial hydrogenation, proceeds according to Formulae I, II, III, VII, V and VI. If desired, the reaction sequence may partially also take the following course: Acylation, partial hydrogenation, allyl rearrangement and splitting off of acid according to formulae I, II, III, IV (X=acyloxy), V and VI. The measures for carrying out the various steps of this method of preparation are the same as those described above.

In accordance with the present invention, the manufacture of vitamin A methyl ether may, for instance, be carried out as follows: 4-(2',6',6'-trimethyl - cyclohexene - (1') - yl) -2-methyl-butene-(2)-al-(1) is condensed with 1-methoxy-3-methyl-pentene-(2)-yne-(4) with the aid of 1 mol of ethyl magnesium bromide. 1 mol of hydrogen is added to the triple bond of the resulting 1-methoxy-3,7-dimethyl-6-hydroxy-9-trimethyl - cyclohexenyl - nonadiene - (2,7) - yne - (4), palladium on charcoal, on which quinoline has been adsorbed before use, being employed as catalyst. The resulting 1 - methoxy - 3,7 - dimethyl - 6 - hydroxy - 9 - trimethyl - cyclohexenyl-nonatriene-(2,4,7) is then acetylated by boiling with acetic anhydride and potassium acetate. The product, which already contains small quantities of vitamin A methyl ether, is boiled with tertiary potassium amylate in tertiary amyl alcohol.

A modification of this process consists in boiling 1-methoxy-3,7-dimethyl-6-hydroxy-9-trimethyl-cyclohexenyl-n o n a t r i e n e-(2,4,7), obtained by partial hydrogenation, with phthalic acid anhydride in an inert organic solvent.

According to the methods of preparation as above set forth, pentaenes (vitamin A ethers) are obtained which possess the same biological activity as vitamin A and its derivatives obtained from natural sources. The products of the process are characterised by causing a maximum of absorption in ultraviolet spectrum at 328 m$\mu$ and by the colour reactions with antimony trichloride, arsenic trichloride, aluminum silicate and trichloroacetic acid, specific to vitamin A.

The products of the process may be purified by the same methods as high concentrates of vitamin A and its derivatives from natural sources (separation between solvents, chromatographic adsorption, careful distillation, etc.). Like natural vitamin A, the products must be protected from the deteriorating effects of light, air and heat. It is advisable to add antioxidants; they may also be present during the different steps of synthesis; tocopherols are particularly suitable as antioxidants.

*Example 1*

4.5 parts by weight of 1-methoxy-3-methyl-pentene-(2)-yne-(4), dissolved in 10 parts by volume of ether, are added in the course of 1 hour to a solution of magnesium-ethyl-bromide (prepared from 1 part by weight of magnesium, 4.6 parts by weight of ethyl-bromide and 20 parts by volume of ether) while stirring. The mixture is refluxed for 6 hours, a gray, gradually solidifying sludge being precipitated. The mixture is left to cool, and then a solution of 6 parts by weight of 4 - trimethyl-cyclohexenyl-2-methyl-butene-(2)-al-(1) in 12 parts by volume of ether is added in the course of 1 hour. The mixture is stirred for several hours at room temperature and then refluxed for 2 hours. Thereupon the reaction mixture is diluted with ether and a 20 per cent. solution of ammonium chloride added while cooling. The solution is washed with water, dried with sodium sulphate and the solvent evaporated. The residue is fractionated in high vacuo, whereby 8 parts by weight of 1-methoxy-3,7-dimethyl-6-hydroxy-9-trimethyl - cyclohexenyl - nonadiene - (2,7)-yne-(4) of boiling point 161–163° C. under 0.05 mm. pressure are obtained as yellowish, viscous oil.

8 parts by weight of this condensation product are hydrogenated in a methyl alcoholic solution, in the presence of 0.02 part by weight of dl-$\alpha$-tocopherol, at room temperature, while using 2 parts by weight of 2 per cent, palladium charcoal, having adsorbed thereto before use 1 part by weight of quinoline, as catalyst. As soon as 1 mol of hydrogen has been taken up, the charcoal is filtered off and the filtrate concentrated. The residue is fractionated in high vacuo. 7.6 parts by weight of 1-methoxy-3,7-dimethyl-6-hydroxy-9-trimethyl-cyclohexenyl-nonatriene-(2,4,7) are obtained in the form of a yellowish oil of boiling point 151–153° C. under a pressure of 0.05 mm. Hg. $n_D^{22°}=1.514$, $d_4^{19°}=0.961$.

1 part by weight of this product is dissolved in 10 parts by volume of acetic anhydride. After addition of 1 part by weight of potassium acetate it is refluxed for 2 hours. The solution is then concentrated in vacuo and the residue taken up in petroleum ether. The solution is washed with bicarbonate of soda and water, dried and concentrated. The residue distills in a molecular still at 85–90° C. under a pressure of $10^{-5}$ mm. Hg. The distillate is a yellowish oil, clearly absorbing in ultraviolet light the rays of 328 m$\mu$.

Purification of vitamin A methyl ether can be effected by the same methods as known for the purification of vitamin A esters derived from natural sources. Thus the methyl ether may be concentrated by adsorption to an aluminum oxide column from petroleum ether solution, development of the chromatogram with petroleum ether and elution of the main zone (showing yellow-greenish fluorescence in the light of a quartz lamp) by adding 20 per cent. of alcohol to the petroleum ether (cf. "Helvetica Chimica Acta," vol. 27, year 1944, page 443). The main zone of the chromatogram may also be washed out with petroleum ether, the eluate, showing strong yellow fluorescence, containing the desired methyl ether. The high concentrate of the methyl ether thus obtained is a yellow viscous oil showing the same colour reactions as vitamin A or the esters thereof, respectively, from natural sources.

The compound has a positive vitamin A effect on the growth of rats deficient in this vitamin.

*Example 2*

10 parts by weight of 1-methoxy-3,7-dimethyl-6-hydroxy-9-trimethyl-cyclohexenyl-nonatriene-(2,4,7) (prepared in accordance with Example 1) are dissolved in 50 parts by volume of acetic anhydride, treated with 5 parts by weight of anhydrous sodium acetate and heated under reflux for 2 hours with exclusion of light. Then, excess acetic anhydride and the glacial acetic acid formed during the reaction are evaporated in vacuo and the residue taken up in petroleum ether of boiling point 30–60° C. and water. Washing is now effected with sodium-bicarbonate solution and water, and the solvent evaporated. The petroleum-ether residue, which already contains small quantities of vitamin A methyl ether, is dissolved in 20 parts by volume of tertiary amyl alcohol and, while stirring and introducing nitrogen, the solution is added in the course of ½ hour to a boiling solution of 5 parts by weight of potassium in 150 parts by volume of tertiary amyl alcohol. After 1 hour, the reaction solution is cooled, diluted with petroleum ether of boiling point 30–60° C. and washed with 95 per cent. methyl alcohol and water. The solvent is dried and evaporated. The petroleum-ether residue (a yellow, viscous oil) contains about 20 per cent. of vitamin A methyl ether.

From this crude product, the pure vitamin A methyl ether with a specific absorption spectrum of vitamin A and a boiling point of 90–95° C./$10^{-5}$ mm. may be obtained by means of chromatographic purification.

*Example 3*

1 part by weight of 1-methoxy-3,7-dimethyl-6-hydroxy-9-trimethyl-cyclohexenyl-nonadiene-(2,7)-yne-(4) (prepared in accordance with Example 1) is dissolved in 10 parts by volume of acetic anhydride and, after addition of 1 part by weight of potassium acetate, heated under reflux for two hours. The solution is then evaporated in vacuo, the residue taken up in petroleum ether and washed with sodium bicarbonate and water, dried and concentrated. The residue is distilled in high vacuo. 1 part by weight of the acetylated compound is obtained in form of a yellowish oil of boiling point 150–152° C./0.08 mm.

11 parts by weight of the acetylated compound are hydrogenated in methyl-alcoholic solution in presence of 0.04 part by weight of dl-α-tocopherol at room temperature, with the aid of 1 part by weight of 4 per cent. palladium-charcoal catalyst, to which 0.5 part by weight of quinoline have been absorbed before use. After absorption of 1 mol of hydrogen, the coal is filtered by suction and the filtrate concentrated. The residue is fractionated in high vacuo. 10 parts by weight of a yellowish oil of boiling point 146–148° C/0.07 mm. Hg are obtained.

10 parts by weight of the partially hydrogenated compound are dissolved in 20 parts by volume of tertiary amyl alcohol and added to a boiling solution of 5 parts by weight of potassium in 150 parts by volume of tertiary amyl alcohol in the course of ½ hour while stirring and introducing nitrogen. The reaction solution is worked up as outlined in Example 2. The petroleum ether residue (5 to 6 parts by weight of a yellow, viscous oil) contains 10 to 15 per cent. of vitamin A methyl ether. The compounds containing hydroxyl which are soluble in methyl alcohol are again acetylated and subjected to the cleavage of acid.

*Example 4*

10 parts by weight of 1-methoxy-3,7-dimethyl-6-hydroxy-9-trimethyl-cyclohexanyl-nonadiene-(2,7)-yne-(4) (prepared in accordance with Example 1) are heated to 50° C. in 30 parts by volume of chloroform and 70 parts by volume of pyridine and a solution of 5 parts by weight of benzoyl chloride in 30 parts by volume of chloroform added in the course of ½ hour while stirring. Stirring is continued for 2 hours at 50° C.; and, after cooling, the reaction solution is diluted with petroleum ether of boiling point 30–60° C., washed with bicarbonate solution, dilute hydrochloric acid and water and the solvent evaporated. The residue is heated for 1 hour to 200° C. and then distilled in high vacuo. After separation of a small part of the first runnings, the main portion distils at 160–180° C./0.08 mm. Hg as a viscous, yellow oil.

10 parts by weight of the benzoylated compound are hydrogenated in methyl-alcoholic solution in presence of 0.5 part by weight of dl-α-tocopherol at room temperature by means of 1 part by weight of palladium charcoal, to which 0.5 part by weight of quinoline are absorbed before use. When 1 mol of hydrogen has been taken up, the charcoal is filtered off by suction and the filtrate concentrated. The residue is dissolved in 20 parts by volume of tertiary amyl alcohol and, as outlined in Example 3, subjected to the cleavage of acid by means of potassium in tertiary amyl alcohol. The resulting vitamin A methyl ether can be purified in the usual manner.

*Example 5*

While stirring and heating under reflux for 2 hours, dry phosgene is passed through a solution of 1 part by weight of 1-methoxy-3,7-dimethyl-6-hydroxy-9-trimethyl-cyclohexenyl-nonatriene-(2,4,7) (prepared in accordance with Example 1) in 25 parts by volume of xylene. The xylene solution is thereupon washed with sodium bicarbonate solution and water and evaporated in vacuo. The purification of the resulting vitamin A methyl ether is effected in accordance with the directions given in Example 1.

*Example 6*

5 parts by weight of 1-methoxy-3,7-dimethyl-6-hydroxy-9-trimethyl-cyclohexenyl-nonatriene-(2,4,7) (prepared in accordance with Example 1) are dissolved in 25 parts by volume of dry benzene and 1 part by weight of pulverised phthalic acid anhydride as well as 0.1 part by weight of α-tocopherol added as stabiliser. The mixture is heated to 100° C. (bath temperature) for 4 hours under exclusion of moisture and while introducing nitrogen. After cooling, the crystallised phthalic acid and excess phthalic anhydride are filtered off, the filtrate boiled down in vacuo and the residue divided between petroleum ether of boiling point 30–60° C. and 95 per cent. methyl alcohol. Non-reacted starting material gets dissolved in methyl alcohol and can again be reacted with phthalic anhydride. The vitamin A methyl ether is to be found in the petroleum ether. The same is washed with water, dried with sodium sulphate and boiled down. 4 parts by weight of a crude product are obtained which contains 15 per cent. of vitamin A methyl ether.

The pure vitamin A methyl ether, which possesses the specific absorption spectrum of vitamin A, can be obtained when working in accordance with the directions given in Example 1.

*Example 7*

6.2 parts by weight of 1-butoxy-3-methyl-pentene-(2)-yne-(4) boiling point 71–74° C./10 mm. and $n_D^{19} = 1.4540$) in 10 parts by volume of ether are added dropwise in the course of ½ hour in a nitrogen atmosphere while stirring to a solution of ethyl magnesium bromide which was prepared from 1 part by weight of magnesium, 4.6 parts by weight of ethyl bromide and 20 parts by volume of ether. Upon condensation of this compound with 6 parts by weight of 4-trimethyl-cyclohexenyl-2-methyl-butene-(2)-al-(1) in accordance with the working method described in Example 1, 1-butoxy-3,7-dimethyl-6-hydroxy-9-trimethyl-cyclohexenyl-nonadiene- (2, 7) -yne- (4), a yellowish oil boiling in high vacuo at 180–184° C./0.04 mm. is obtained. $n_D^{20}=1.512$. Yield: 80 per cent.

In a manner analogous to Example 1, the compound is partially hydrogenated in presence of deactivated palladium charcoal in methyl alcohol. The resulting 1-butoxy-3,7-dimethyl-6-hydroxy-9-trimethyl-cyclohexenyl-nonatriene-(2,4,7), a yellowish oil, boils at 168–170° C./0.09 mm. $n_D^{20.5}=1.5087$. Yield: 90 per cent.

10 parts by weight of this compound are boiled in 50 parts by volume of benzene with 2 parts by weight of pulverised phthalic anhydride while stirring, in accordance with the directions given in Example 6. The resulting vitamin A butyl ether is purified in a percolation chromatogram by means of petroleum ether of boiling point 60–80° C., at a column consisting of 500 times the quantity of weakly activated aluminum oxide. The butyl ether slowly migrates through the column, whereby its position can easily be detected by the intensively yellow-green fluorescence in ultraviolet light. The best fraction of the percolation chromatogram is characterised by the highest stability of the Carr-Price-colour reaction 620 m$\mu$>580 m$\mu$) and by the characteristic U. V. absorption spectrum of vitamin A with the maximum at 328 m$\mu$ ($n_D^{20}=1.570$). The by-products absorbing at lower wave lengths are less adsorbed and enrich themselves in the first runnings. Unchanged 1-butoxy-3,7-dimethyl-6-hydroxy- 9-trimethylcyclohexenyl - nonatriene- (2,4,7) adheres to the upper part of the aluminium oxide column. It is eluted with methyl alcohol and, after evaporation of the solvent, subjected to dehydration with phthalic anhydride in the same manner, whereupon a further quantity of vitamin A butyl ether is obtained in the percolation chromatogram.

I claim:

1. A compound of the formula

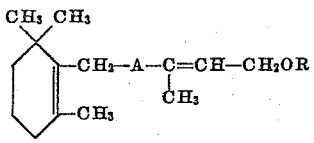

wherein A is selected from the group consisting of the radicals

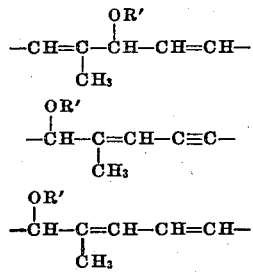

and R is selected from the group consisting of alkyl, aryl and aralkyl radicals and wherein R' is a member of the group consisting of acetyl and benzoyl.

2. A compound in accordance with claim 1, wherein the radical R is a methyl radical.

3. A compound in accordance with claim 1, wherein the radical R' is the acetyl radical.

4. A compound in accordance with claim 1, wherein the radical R' is the benzoyl radical.

5. A process of treating an ether of 1-hydroxy-3, 7-dimethyl-6-hydroxy-9-trimethyl-cyclohexenyl-nonadiene-(2, 7)-yne-(4) to produce a vitamin A ether, which process comprises a partial hydrogenation to convert the triple bond to a double bond and an allyl rearrangement effected by the action of an agent selected from the group consisting of halides and anhydrides of acetic, benzoic and phthalic acids, these two steps being employed successively.

6. A process according to claim 5 in which phthalic anhydride is employed as the rearrangement agent.

7. A process according to claim 5 in which the hydrogenation step precedes the allyl rearrangement.

8. A process according to claim 7 in which phthalic anhydride is used as the rearrangement agent.

9. A process which comprises treating 1-methoxy-3, 7-dimethyl-6-hydroxy-9-trimethyl-cyclohexenyl-nonadiene-(2, 7)-yne-(4), which process comprises partially hydrogenating the said compound to convert the triple bond to a double bond and then effecting an allyl rearrangement by means of an agent selected from the group consisting of halides and anhydrides of acetic, benzoic and phthalic acids.

10. A process according to claim 9 which includes the subsequent step of splitting off acid to produce the methyl ether of vitamin A.

OTTO ISLER.

REFERENCES CITED

The following references are of record in the file of this patent:

UNITED STATES PATENTS

| Number | Name | Date |
|---|---|---|
| 2,369,157 | Milas | Feb. 13, 1945 |
| 2,369,159 | Milas | Feb. 13, 1945 |
| 2,369,163 | Milas | Feb. 13, 1945 |
| 2,382,086 | Milas | Aug. 14, 1945 |
| 2,412,465 | Milas | Dec. 10, 1946 |

OTHER REFERENCES

Heilbron et al., "Jour. Chem. Soc.," 1942 (London), pages 727–733.

Heilbron et al., ibid 1945 (London), pages 77–81 and 84–94.

Certificate of Correction

Patent No. 2,451,736.

October 19, 1948.

OTTO ISLER

It is hereby certified that errors appear in the printed specification of the above numbered patent requiring correction as follows:

Column 2, formula VII, extreme right-hand portion thereof, for "$CH_2O$" read *$CH_2OR$*; column 8, line 7, for "0.5 part" read *0.05 part*; line 10, for "absorbed" read *adsorbed*; column 9, line 28, for "($n_D^{20}$=1.570)" read *($n_D^{20}$=1.576)*;

and that the said Letters Patent should be read with these corrections therein that the same may conform to the record of the case in the Patent Office.

Signed and sealed this 8th day of March, A. D. 1949.

[SEAL]

THOMAS F. MURPHY,
*Assistant Commissioner of Patents.*